United States Patent [19]

Gotter

[11] 4,143,542
[45] Mar. 13, 1979

[54] TENSION INDICATOR FOR SCREW CONNECTIONS

[75] Inventor: Eugen Gotter, Düsseldorf, Fed. Rep. of Germany

[73] Assignee: Hoffmann Werke, J. Oswald Hoffmann GmbH, Lintorf, Fed. Rep. of Germany

[21] Appl. No.: 865,518

[22] Filed: Dec. 29, 1977

[51] Int. Cl.² .............................................. G01L 5/00
[52] U.S. Cl. .................................................... 73/761
[58] Field of Search ................ 73/88 F; 116/DIG. 34

[56] References Cited

U.S. PATENT DOCUMENTS 3,060,731 10/1962 Adise ..................................... 73/88 F
3,605,491 9/1971 Senn ..................................... 73/88 F Primary Examiner—Anthony V. Ciarlante
Attorney, Agent, or Firm—Parmelee, Miller, Welsh & Kratz

[57] ABSTRACT

An indicator to check whether a screw connection has been properly tightened, comprising a housing to be penetrated by the screw bolt, and having a bottom at one end and a slide-fit disc at the other end, compression springs housed within the housing and being compressed by the tightening force, the relative position of the disc within the housing being representative of said force, and visible or tangible for check of proper tension.

1 Claim, 1 Drawing Figure

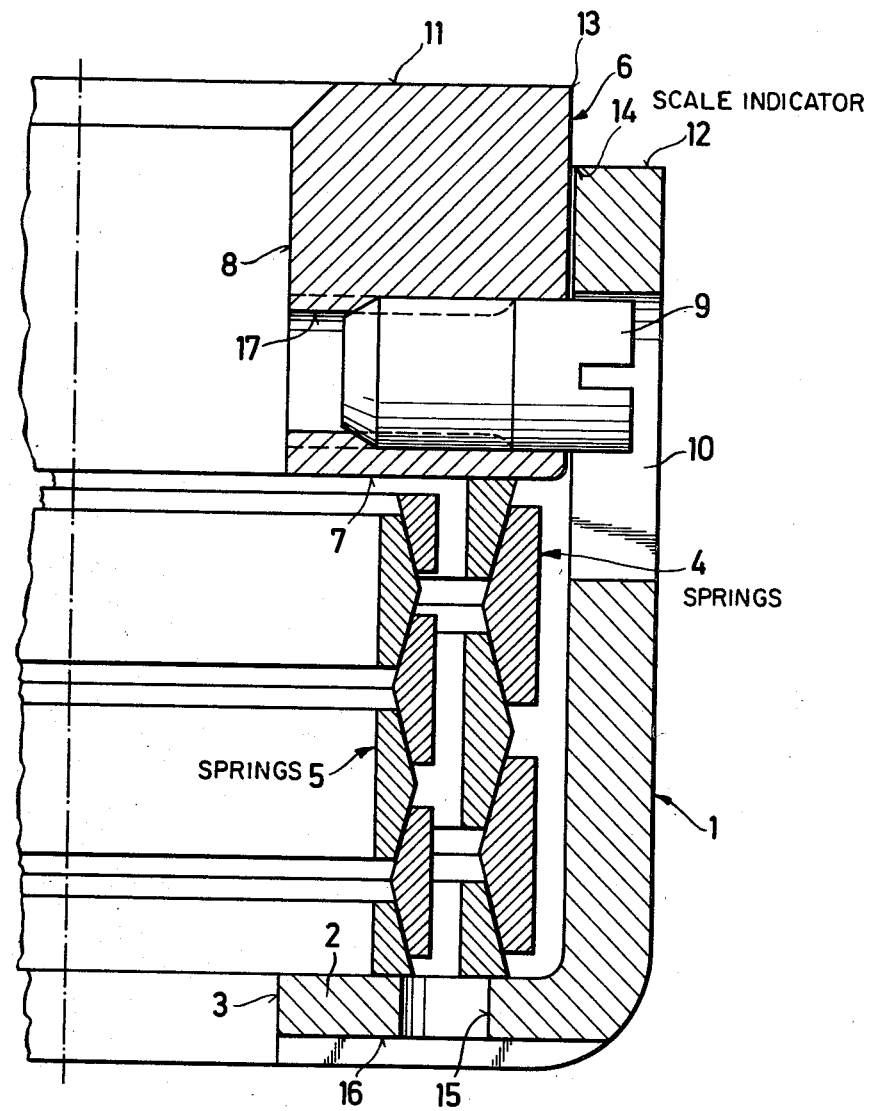

TENSION INDICATOR FOR SCREW CONNECTIONS

BACKGROUND OF THE INVENTION

The present invention relates to a tension indicator for screw connections.

Usually, where the tension of a screw connection must be within predeterminde limits, the connection is tightened by means of a key provided with a torque indicator or means to limit the torque to a maximum value. This tool serves therefor as the tension indicator.

In many cases this practice has proven to be satisfactory. However, there are certain drawbacks: There is no means to check the connection, once tightened, whether the applied tension was adequate or has remained, after a certain time of service, within the prescribed limits. Further, there are designs including more than one screw connection acting upon one and the same component such that tightening of one screw will affect the tension of one or more other screw connections because of tilting moments or the like.

It is a primary object of the invention to provide a tension indicator for screw connections permitting, at any time, whether there is adequate tension provided by the screw connection.

SUMMARY OF THE INVENTION

A screw connection generally comprises at least one component having an eye through which a threaded shaft of a bolt extends and either two nuts threaded on the bolt or one nut and a head forming an integral part of the bolt. According to the invention, a tension indicator is mounted on the bolt between either a nut and the component or between the bolt head and the component. To be mounted on the bolt, the indicator comprises a housing having a substantially cylindrical wall and a substantially annular bottom with a central opening through which the bolt extends. An annular cover disc is slidably fitted into the housing, and the bolt extends through a central opening of this disc as well. An elastic member, preferably comprised of a ring spring pile, is disposed within the housing between the bottom of the latter and the cover disc. The axial position of the cover disc within the housing is indicated by suitable means, preferably visible and/or tangible portions of the disc. The axial relative position of the disc is representative of the axial compression of the elastic member and thus of the tension to which the bolt is subjected. In case of just one single tension being predetermined, the elastic member may be dimensioned such that upon proper tightening of the connection, the outer disc will be just flush with the adjacent end of the housing wall. For extremely high tensions a maximum of compression may be indicated with even a small indicator if the elastic member is formed by two coaxially disposed annular spring packs. In this case, however, the bottom wall of the housing is to be provided with a vent aperture at the radial position of the annular space between said spring packs.

DESCRIPTION OF THE DRAWING

A preferred embodiment of the invention is illustrated in the accompanying drawing showing a section elevation partially broken away.

The indicator comprises a substantially cup-shaped or hollow cylindrical housing 1 having an inwardly turned bottom 2. An axial bore 3 extends through the bottom. The space confined by the housing houses two annular spring piles 4 and 5, respectively, which are coaxial to each other and to the housing wall, and an annular disc 6 having an inner diameter 8 equal to that of bore 3. This diameter slightly exceeds the outer diameter of a screw shaft (not shown) on which the indicator is to be used. The disc side 7 facing bottom 2 abuts one or both of the spring members 4,5. In the embodiment shown, the disc piles are different in axial height due to the fact that components available on the market have been used.

A thread hole 17 extending radially through disc 6 receives a setscrew 9 which projects into a slot 10 machined into the cylindrical wall of housing 1; the setscrew permits storing and transport of the indicator in its assembled status as shown but is not indispensable for the intended function.

The indicator is clamped between a component (not shown) and the nut or screw head of the bolt-nut-assembly by which such component is mounted. Preferably, the outer diameter of disc 6 facing the nut or bolt head is dimensioned so that part at least of nut or bolt head abutting disc face 11 may penetrate into housing 1 without seating on upper housing face 14.

Upon tightening of bolt or nut, disc 6 will first compress spring pile 4 and later spring pile 5, too. The dimensions of housing 1 and disc 6, on the one hand, and the springs on the other hand have been selected such that a desired tension force, of, say two million pounds will be reached upon disc face 11 being flush with housing face 12. In order to get an unambigous indication either visually or, in darkness, by finger tip check, disc edge 13 and housing edge 14 are left unchamfered. Alternatively, on the outer cylindrical wall of disc 6 an axially extending graduation may be engraved to be read by aiming over housing edge 14.

The annular springs of spring piles 4 and 5 are usually unslit. In general, the springs will be lubricated and a grease column will fill the annular space between the spring piles 4 and 5. For such grease is incompressable, there would be a danger that a spring annulus will burst upon tightening of the screw. To eliminate this risk, the housing is provided with at least one aperture 15 extending parallel to the assembly axis through bottom 2 and opening into this annular space between the spring piles the other mouth of this aperture communicating, via radial groove 16, with the exterior and/or bore 3.

What is claimed is:

1. An indicator for the tension to which a bolt of a screw connection is subjected, comprising a housing having a hollow cylindrical wall and a bottom a disc slidingly disposed within said housing, said bottom and said disc each having a coaxial bore, compression spring means comprising two coaxially disposed annular spring piles disposed within said housing between said bottom and said disc, said bottom having at least one aperture to vent an annular space between said two piles, and means to indicate the relative position of said disc within said housing upon the indicator being subjected to a force directed to compress said spring means.

* * * * *